(12) United States Patent
Dang et al.

(10) Patent No.: US 11,727,469 B2
(45) Date of Patent: *Aug. 15, 2023

(54) VEHICLE LISTING GENERATION AND OPTIMIZATION SYSTEM

(71) Applicant: Capital One Services, LLC, McLean, VA (US)

(72) Inventors: Steven Dang, Plano, TX (US); Elizabeth Furlan, Plano, TX (US); Chih-Hsiang Chow, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/588,633

(22) Filed: Jan. 31, 2022

(65) Prior Publication Data

US 2022/0156819 A1    May 19, 2022

Related U.S. Application Data

(63) Continuation of application No. 17/078,181, filed on Oct. 23, 2020, now Pat. No. 11,270,370.

(51) Int. Cl.
*G06Q 30/00* (2023.01)
*G06Q 30/0601* (2023.01)
(Continued)

(52) U.S. Cl.
CPC ......... *G06Q 30/0633* (2013.01); *G06F 18/23* (2023.01); *G06Q 30/0206* (2013.01); *G06Q 30/0641* (2013.01)

(58) Field of Classification Search
CPC ........... G06Q 30/0633; G06Q 30/0206; G06Q 30/0641; G06F 18/23
See application file for complete search history.

(56) References Cited

U.S. PATENT DOCUMENTS

2009/0187477 A1    7/2009    Bardin et al.
2013/0262241 A1    10/2013    Nelson
(Continued)

FOREIGN PATENT DOCUMENTS

KR    10-1926404 B1    12/2018
KR    10-2072820 B1    2/2020

OTHER PUBLICATIONS

Sena, Mark P., and Gerald Braun. "An examination of consumer behavior on eBay motors." Contemporary Research in E-Marketing, vol. 2. IGI Global, 2005. 40-57.*

(Continued)

*Primary Examiner* — Kathleen Palavecino
(74) *Attorney, Agent, or Firm* — Sterne, Kessler, Goldstein & Fox P.L.L.C.

(57) ABSTRACT

Disclosed herein are various embodiments for a vehicle listing generation and optimization system. An embodiment operates by receiving a request to generate a vehicle listing to sell a vehicle on a website. A plurality of vehicle listings similar to the vehicle associated with the request are determined, the plurality of vehicle listings including a plurality of features providing information about a respective vehicle featured in the vehicle listing and a sales time metric specifying a time it took to sell the respective vehicle featured in a respective vehicle listing. Clustering is performed on the set of vehicle listings based on the sales time metrics, and a first cluster is selected. It is identified which of the plurality of features are common amongst at least a subset of the vehicle listings of the selected cluster. A user interface of a sales template for the vehicle associated with the request is generated.

20 Claims, 4 Drawing Sheets

(51) Int. Cl.
*G06Q 30/0201* (2023.01)
*G06F 18/23* (2023.01)

(56) References Cited

U.S. PATENT DOCUMENTS

2014/0337120 A1  11/2014  Ercanbrack
2017/0046733 A1   2/2017  Schler

OTHER PUBLICATIONS

U.S. Appl. No. 17/078,181, "Vehicle Listing Generation and Optimization System," to Steven Dang, filed Oct. 23, 2020.

* cited by examiner

FIG. 4

VEHICLE LISTING GENERATION AND OPTIMIZATION SYSTEM

CROSS-REFERENCE TO RELATED APPLICATIONS

This application is a continuation of U.S. patent application Ser. No. 17/078,181 entitled "Vehicle Listing Generation And Optimization System," filed Oct. 23, 2020, which is hereby expressly incorporated herein by reference in its entirety.

BACKGROUND

Many people sell items online, including both small, inexpensive items, such as trinkets and t-shirts, and larger, more expensive items such as vehicles and real estate. With more expensive items, potential buyers often want more information and more particular information to make sure the item they are about to purchase will suit their needs.

A vehicle listing may include different information about the vehicle that is provided by a user. Examples of vehicle listing information may include images of the vehicle, description information, model type, color, mileage, condition, features, etc. Providing all of this information requires both time and computing resources to generate and produce. For example, a user may take a picture, edit the picture, and upload the picture to a website for a vehicle listing. Then each time the vehicle listing is accessed the picture is loaded over and over again at the requesting devices.

The purpose behind a vehicle listing is to sell the vehicle in the shortest amount of time, with the highest possible price and the least amount of effort, cost, time, and computing resources possible. If a user generates a vehicle listing, and the vehicle does not sell, then all of the computing resources, time, and, energy spent will have been wasted. As such, there is a balance between providing enough information for a potential buyer to make an informed decision, and providing too much information such that time, money, and computing resources are wasted in collecting, providing, and making available the extraneous information.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a vehicle listing generation and optimization system.

Figure 1:
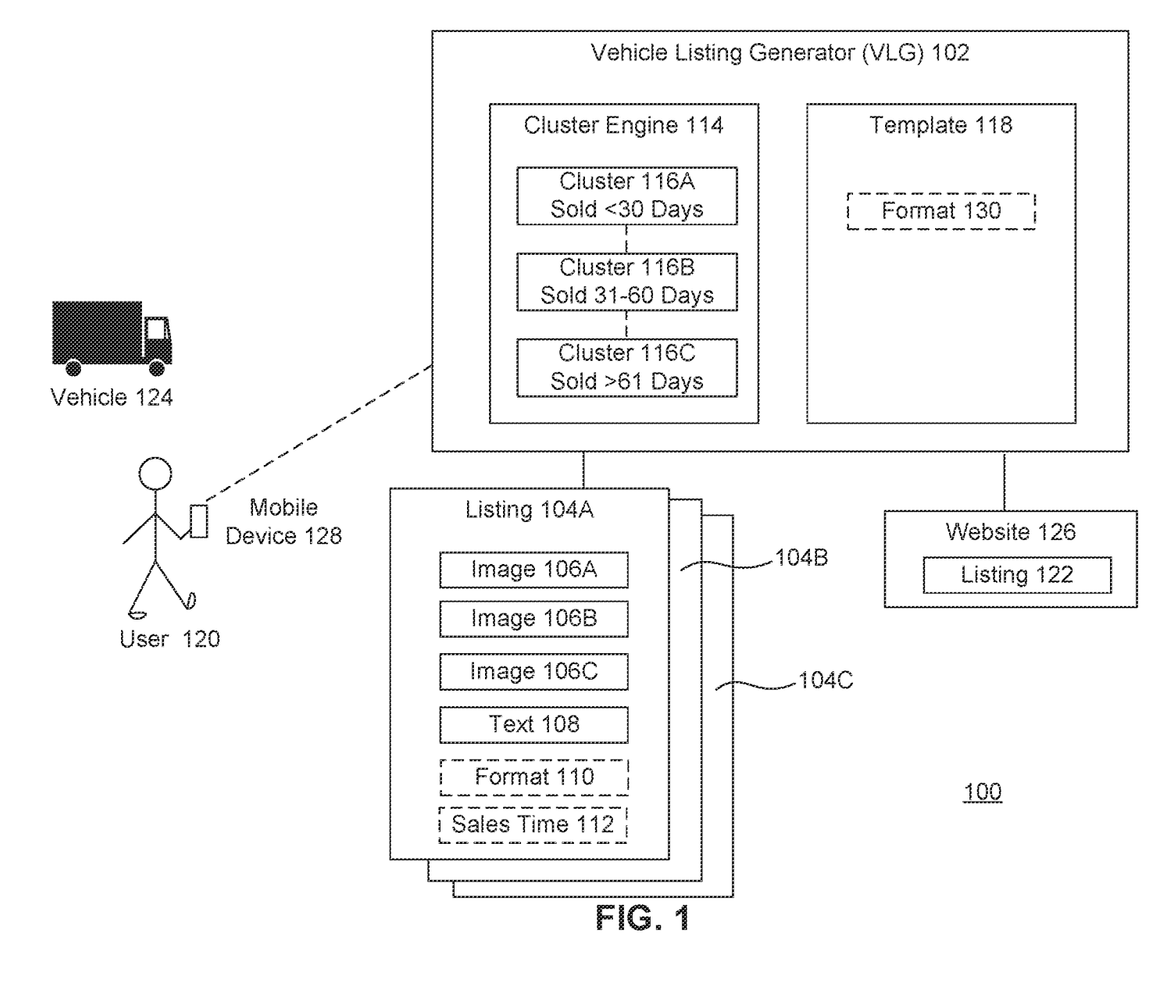
FIG. 1 is a block diagram illustrating example functionality for providing a vehicle listing generation and optimization system, according to some embodiments.

FIG. 1 is a block diagram 100 illustrating example functionality for providing a vehicle listing generation and optimization system, according to some embodiments. Generating vehicle listings for selling a vehicle online on a website or through the Internet can be a time and resource consuming process: in taking pictures, processing or editing the pictures, writing text, providing vehicle information, etc.

A vehicle listing generator (VLG) 102 may help to improve or optimize the vehicle listing generation process by producing listings that are more likely to produce results (e.g., sales in faster times) while requiring fewer computing resources (e.g., fewer images, less text, smaller packets, less image processing, smaller data packets, etc.) and that require less time and energy from the user to create.

In an embodiment, VLG 102 may use artificial intelligence clustering or unsupervised learning to identify what information of a vehicle listing is most closely related to generating sales or interest in a particular vehicle type. VLG 102 may begin with a set of training data, and may refine its clusters and suggestions as to how to organize or format a vehicle listing over time with new vehicle listings that have produced results such as sales.

VLG 102 may identify what perspectives of images, types of information or text, and/or listing formats or arrangements produce the best and/or worst results in terms of sales, views, clicks, price, or some other performance metric. VLG 102 may analyze and cluster or group previous sales listings 104A-C by vehicle type, vehicle class, year, price range, geography, condition, make, model, color, etc. VLG 102 may then identify what characteristics, features, images, most closely corresponded to successful outcomes or sales with the highest price or shortest number of days to sell for particular vehicles. Using this data-backed, clustering analysis, VLG 102 may guide a user into how to create optimized sales listings with less computing resources that are more effective at producing desired or desirable outcomes.

In an embodiment, VLG 102 may receive or have access to a set of historical or closed listings 104A-C. For simplicity, only three listings 104A-C are illustrated in the set of listings, however the set of listings may actually include any number of listings: hundreds, thousands, or millions of listings. Listings 104A-C may include previously generated listings or advertisements for vehicles for sale across one or more geographic regions and/or websites 126. Each listing 104A-C may include its own set of images 106A-C and/or information or text 108 about the vehicle listed for sale in the particular listing. Each of those images 106A-C may be taken from different perspectives, such as front of car, back of car, driver side, passenger side, display panel, interior, engine, trunk, etc.

Each listing 104A-C may also include its own format 110. Format 110 may include an ordering or relative placement or arrangement of the images 106A-C and/or text 108 to one another on a particular webpage or listing. For example, listing 104A may include a format in which all the images 106A-C appear above the text 108. Listing 104B however may include a format 110 in which the text about the vehicle is placed to the left of only a singular image (as opposed to having multiple images). Listing 104C may then have its own unique format 110, or may have a similar format 110 to either listing 104A or 104B. Format 110 may also include the font size, font type, colors, or filters used on the images 106 and/or text 110 of a particular listing 104. As used herein, listing 104 is a general term that may be used to refer to any one and/or combination of the listings 104A-C.

In an embodiment, each listing 104 may also include one or more results metrics, such as sales time 112. Sales time 112 may be a measure of how long a particular listing was active before the vehicle was sold, or how long the vehicle has been listed (if not sold, or before it was removed or deactivated). Sales time 112 may include a number of hours, days, weeks, or months before the listing was updated as being sold, or deactivated. Other example results metrics may include price and number of clicks or response. For example, the number of clicks may measure how many clicks a particular listing 104 received during the first week of the sales listing, or the average number of clicks per day.

In an embodiment, VLG 102 may cluster the listings 104 based on the sales time 112 or other results-oriented metric. VLG 102 may use clustering analysis to generate clusters 116A-C of the listings 104A-C. Each cluster 116A-C may include a set of listings that were determined to be similarly effective in producing a desirable outcome, such as producing a sale within a particular period of time.

A shorter sales time 112 (or more clicks) may indicate a more effective listing 104. VLG 102 may then identify similarities amongst overlapping features of the listings 104 with shorter sales times, and similarities or commonalities amongst those listings 104 with longer sales times. In an embodiment, VLG 102 may weigh the similar features of the more effective listings (e.g., from cluster 116A) more heavily than the features of the less effective listings (e.g., from cluster 116B and 116C), in determining what listing attributes would be recommended to include in a new sales listing 122 in order to shorten the sales time or maximize the number of clicks. In an embodiment, the similarities amongst listings in the least effect cluster 116C may be used to determine what features should not be included in a new sales listing 122.

As noted above, other metrics such as price, number of clicks, engagement measures, time spent on the listing, responses to listing, etc. may be used in addition to or as an alternative to sales time 112 to cluster and analyze the listings 104, as described herein. Engagement may include for example, whether someone saves or favorites a listing, saves an image from the listing, or emails the listing to someone else.

In an embodiment, a cluster engine 114 may perform the actual clustering process, using one or more metrics, and any type of clustering process, including but not limited to K-means, mean-shift, density-based, expectation-maximization, and Gaussian clustering. An example clustering based on sales time 112 is illustrated in clusters 116A, 116B, and 116C which are arranged and ordered based on the number of days the listing took to sell the listed vehicle.

As illustrated, cluster 116A may include those listings 104 that resulted in vehicles being sold in less than 30 days, cluster 116B may include those listings 104 that resulted in vehicles being sold between 31-60 days, and cluster 116C may include those listings 104 that resulted in vehicles being sold in more than 61 days or that were not sold at all. In an embodiment, there may be another cluster for listings that were deactivated before sale, or those listings may be ignored from the clustering process.

The 30 day time period increments are exemplary, and based on the actual sales times 112, the number of clusters and time periods of the clusters 116 (which is used to refer to any or the combination of the group of clusters 116A-C) may vary. In an embodiment, the clusters 116A-C may be updated on an ongoing basis as new listings 104A-C are received and processed. For example, when a new listing is received, VLG 102 may cluster the listing according to the clusters 116A-C and processes described herein.

In an embodiment, with ongoing listing analysis, VLG 102 may detect, in real-time, when sales trends are changing. For example, while an original set of listings 104 may have deemed side view as being more important than front view for a particular vehicle, newer or more recent sales (which may be weighted more heavily by VLG 102) may indicate listings with front view images first sold faster than side view first. This may cause the clusters 116A-C, and the identified overlapping features and recommendations for a new sales listing 122 to be adjusted through a template 118.

Based on the listings 104 in each cluster 116, VLG 102 may determine commonalities or overlapping features present in the various listings 104 of the clusters 116 which may be attributed to contributing to the corresponding sales metric 112. For example, VLG 102 may identify that 90% of the listings in the first cluster 116A include a first image 106A that is of a driver-side view of the vehicle, and only 30% of the listings in the third cluster 116C include the driver-side view of the vehicle as the first image. Based on this analysis, VLG 102 may determine that including a driver-side view of the vehicle as the first image in the listing improves the likelihood of selling the vehicle in a shorter time period.

As referenced above, cluster engine 114 may perform clustering and analysis on any sales or effectiveness metric that may be available with listings 104, such as price, clicks, numbers of responses, or engagement, and based on any portion(s) of a sales listing: text, images, format, etc. In an embodiment, a user 120 may select which results metrics are most important to the user 120, and VLG 102 may cluster the listings 104A-C and identify commonalities and generate a template 118 accordingly. As described herein, VLG 102 may generate multiple different templates 118 based on the selections of a user 120.

In an embodiment, VLG 102 may differentiate between vehicle types. For example, while drive-side view may be important for a first model truck, for a different model truck, or for a different type of vehicle: car, boat, etc., different views or perspectives for images 106A-C may be more correspondent or effective to producing faster sales or more clicks. For example, sales of a different type of truck may indicate that rear view is more valuable than side view. Or for example, images of boats in the water may be more common amongst listings in cluster 116A than the images in the listings of either cluster 116B or 116C.

In an embodiment, VLG 102 may group or vary commonalities by geography. Such that listings of trucks in a first climate or geographic region that include a front view with the text "rugged" may sell faster than similar trucks in a second climate or geographic region in which the interior images or the term "luxury" produce faster sales.

In an embodiment, VLG 102 may determine any commonalities of the format 110 of the listings 104. In an embodiment, format 110 may include the ordering and/or placement of images 106, the types of information or text 108, and the ordering and/or placement of the text 108 and images 116, and the size, font, or color of text.

As just referenced, using cluster and other analysis, VLG 102 may identify commonalities and overlapping features amongst the listings 104 within and across the clusters 116A-C according to the sales time 112 metric. Based on the cluster and other analysis, VLG 102 may generate a template 118 that enables a user 120 to generate a listing 122 for a vehicle 124 on a website 126 using their mobile device 128.

In an embodiment, the template 118 may guide or recommend to the user 120 as to which information (e.g., text 108 and/or perspectives of the vehicle for sale 124 in images 106A-C) is needed to produce a fastest sale or most clicks on their advertisement. The template 118 may recommend the least amount of information that is determined to be correspondent to increased or faster sales, thereby minimizing both the time and computing resources required to create a sales listing 122 on website 126.

In an embodiment, VLG 102 may have determined that users only went to the fifth or later images of a sales listing 104 12% of the time for the first two clusters 116A, 116B, and thus the first four images are the most important. A user 120 may want to upload eight images of their vehicle 124. Based on the data-backed analysis, VLG 102 may recommend additional image processing or refinement (e.g., adding filters, adjusting color or brightness, etc.) on only the first four images. Thus rather than investing the computing resources and time in editing all eight images, only four images may be image processed. In another embodiment, upon receiving the recommendation from VLG 102 via template 118, the user 120 may only upload the best four images for their sales listing 122, instead of all eight images thus saving bandwidth and computing resources.

In an embodiment, template 118 may be integrated into a setup wizard program that walks a user 120 through the process of setting up a listing 122 using their mobile device 128 (e.g., mobile phone, laptop, tablet, etc.). In an embodiment, user 120 may log in to or create an account with a particular website 126 that enables user 120 to post a listing 122 offering their vehicle 124 for sale. Examples of website 126 may include a dealership website, online sales portal, or online classified listings (including social media related classifieds). In an embodiment, website 126 may communicate with an app that is operable directly from mobile device 128. In an embodiment, VLG 102 may receive information from user 120 through template 118, and upload or generate sales listings 122 or the vehicle 124 across multiple different websites 126, adjusting the format 130 accordingly, based on the data or listings 104A-C particular for each website 126 or across different websites 126. In an embodiment, VLG 102 may then auto-generate the listing.

In an embodiment, using their mobile device 128, user 120 may indicate they want to sell their truck 124 or other vehicle such as a car, motorcycle, bicycle, van, etc. Template 118 may then prompt the user 120 for images of a driver side view, passenger view, interior, engine, and other perspectives of the vehicle 124 that have been determined to be most correspondent to faster sales for previous listings 104A-C for a similar vehicle to the vehicle for sale 124. In an embodiment, template 118 may recommend against including certain other images, such as images of the owner with the vehicle which may have been included in the listings of cluster 116C which took the longest to sell.

Figure 2:
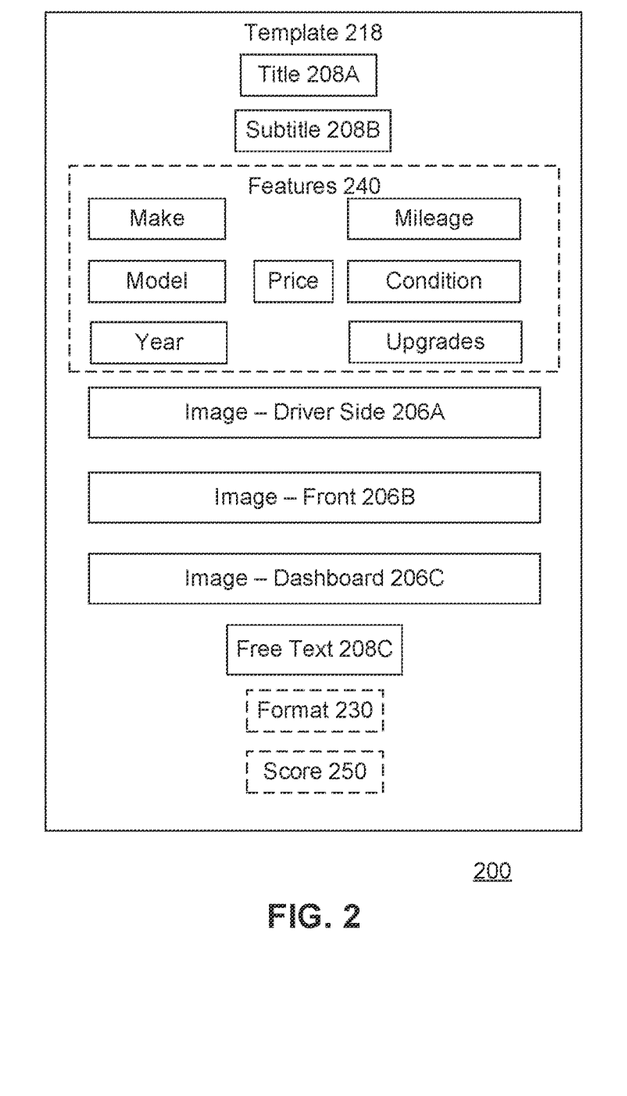
FIG. 2 is a block diagram illustrating an example template, according to some embodiments.

FIG. 2 is a block diagram 200 illustrating an example template 218, according to some embodiments. The template 218 may be an example embodiment of template 118 for a sales listing 122. In an embodiment, VLG 102 may guide a user 120 into filling out the various sections of template 218 for a listing 122.

As illustrated, the user 120 may be prompted to provide various text, information, pictures (from particular perspectives), audio, video, and/or other multimedia about the vehicle for sale. For example, template 218 may include particular images 206A-C that were determined, based on the clustering analysis of various successful listings 104, to be important to potential buyers and correspondent to faster sales (with cluster 116A). Examples may include a driver side image of the vehicle 206A, an image of the front of the vehicle 206B, and an image of the dashboard 206C. In other embodiments, different numbers of images and/or different perspectives could be requested or required as part of template 218. The user 120 may also upload other, non-requested, image perspectives or information.

In an embodiment, the user 120 may select, by using their mobile device 128, which portion of the template 218 the user wants to provide. For example, the user may select driver side image 206A and be prompted to select from their camera roll or take a driver side picture of their vehicle.

VLG 102 may also request information about features 240 of the vehicle from a user 120. Some example features 240 as illustrated and include: make, model, year, mileage, price, condition (e.g., new, good, poor, etc.), upgrades, and price. Other example features may include whether it has satellite radio/television, DVD player, mobile phone connections, color, interior color, interior material, wheel size, damage, etc. In an embodiment, the feature information 240 may be provided via text and/or images. For example, VLG 102 may request a picture of the odometer to verify the mileage.

Template 218 may include a place for a user to provide a title 208A, a subtitle 208B, and any free text 208C or user provided description information that the user 120 wants to provide. In an embodiment, template 218 may include parameters or recommendations for text 208A-C, such as recommended length, recommended words to use and/or recommended words to avoid.

Format 230 may refer to a recommended formatting, ordering, and/or alignment of the information (text, images, or multimedia) of template 218 as described above. For example, format 230 may indicate that features 240 should appear before images 206A-C in a vertical alignment of a listing, and the particular ordering of the images 206A, 206B, and then 206C relative to each other.

In an embodiment, VLG 102 may score the various features or portions of template 218 that are provided or uploaded by user 120. For example, as part of the clustering analysis, VLG 102 may perform, identify, or generate a scoring system that corresponds to the relative importance to the various features of template 218. For example, driver side image 206A may be provided the highest weighted score, while free text 208C may be assigned the lowest weighted score. Or, for example, scores may be assigned in a binary manner, in that the inclusion of a feature of template results in a score of 1, while a user 120 not provided particular information, may result in a 0 score. In an embodiment, a feature that was identified across more of the listings of an effective cluster 116A, such as dashboard images 206C may be scored higher than information that was identified in fewer listings of the same cluster 116B, such as trunk images.

In an embodiment, during or after user 120 has provided information for template 218, VLG 102 may generate and display a score 250 for the user 120. The score may be a completeness or likelihood of sales score based on the scoring system. For example, the user may provide some of the information of template 218, but not all of the information. VLG 102 may inform the user 120 that the template 218 has a score of 8, and that templates with scores less than 12 are demonstrated to take twice as long to sell. Then, for example, VLG 102 may recommend which portions of template 218 user 120 needs to provide information for in order to reach the score of 12. In an embodiment, VLG 102 may not allow template 218 to be activated as a sales listing 122 until a minimum threshold score has been reached.

Figure 3:
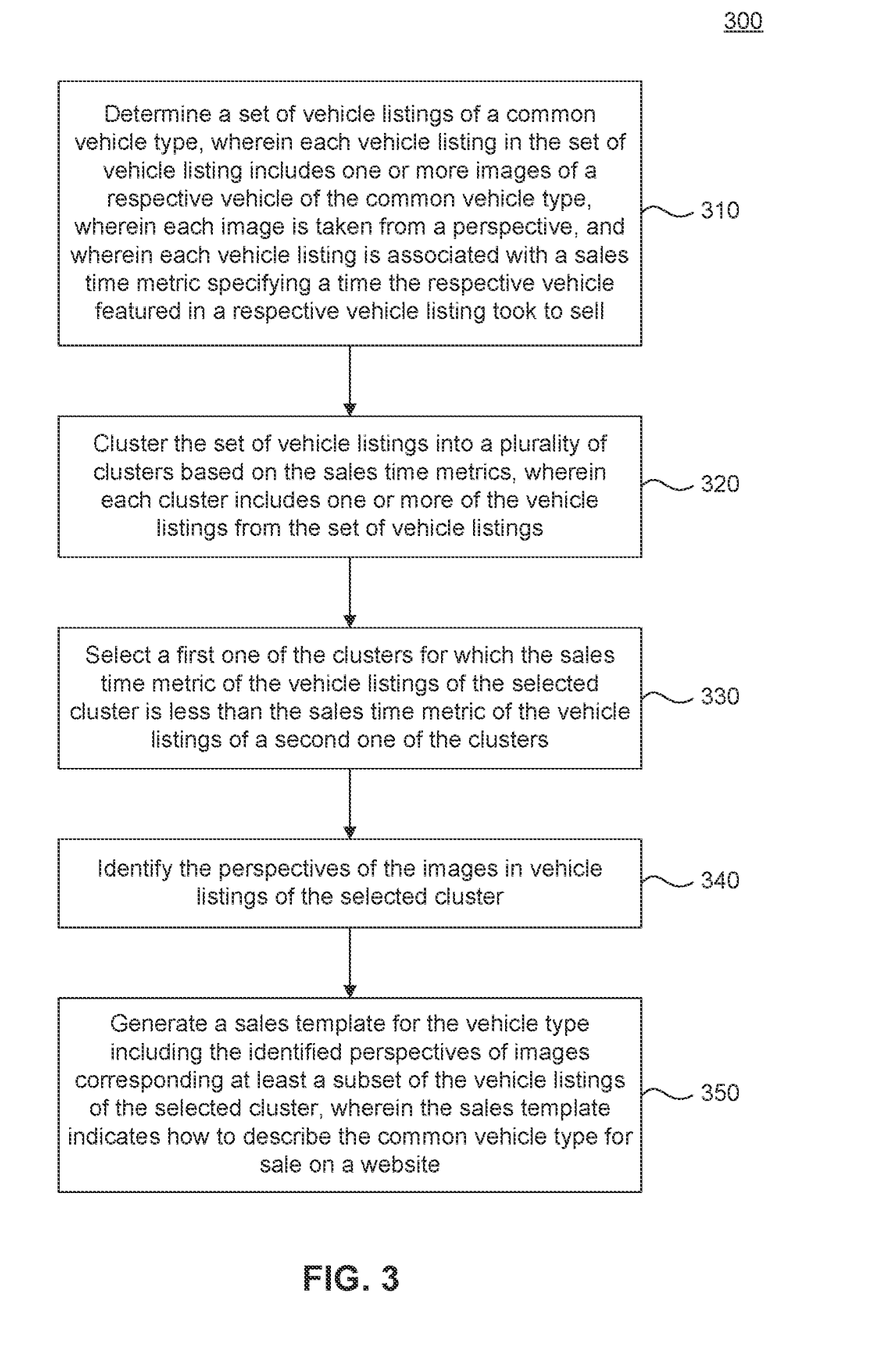
FIG. 3 is a flowchart illustrating example operations of a vehicle listing generation and optimization system, according to some embodiments.

FIG. 3 is a flowchart 300 illustrating example operations of a vehicle listing generation and optimization system, according to some embodiments. Method 300 can be performed by processing logic that can comprise hardware (e.g., circuitry, dedicated logic, programmable logic, microcode, etc.), software (e.g., instructions executing on a processing device), or a combination thereof. For example, various steps in method 300 may be performed using one or application programming interfaces (APIs) operating on one or more processing devices. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to FIG. 1. However, method 300 is not limited to the example embodiments.

In 310, a set of vehicle listings of a common vehicle type is determined. Each vehicle listing in the set of vehicle listing may include one or more images of a respective vehicle of the common vehicle type. Each image may be taken from a particular perspective. Each vehicle listing may also correspond to a sales time metric specifying how long the respective vehicle featured in a respective vehicle listing took to sell. For example, VLG 102 may receive a set of listings 104A-C for a car 124 of a particular make and model. Each listing 104A-C may include images 106A-C of the respective vehicles taken at different perspectives, from different points of views, different angles, or of different features of the car 124. VLG 102 may also receive or determine a sales time 112 metric indicating how long the particular vehicle 124 took to sell on a website 126.

In 320, the set of vehicle listings is clustered into a plurality of clusters based on the sales time metrics. Each cluster may include one or more of the vehicle listings from the set of vehicle listings. For example, cluster engine 114 may cluster or group the listings 104A-C into various clusters 116A-C based on the sales time metric 112. In an embodiment, multiple different clusters 116A-C may be generated based on different results-oriented metrics that were selected.

In 330, a first one of the clusters for which the sales time metric of the vehicle listings of the selected cluster is less than the sales time metric of the vehicle listings of a second one of the clusters is selected. For example, VLG 102 may identify the listings of cluster 116A sold faster than listings of cluster 116B, and thus the features of the listings of cluster 116A are to be weighed more heavily than the features of listings of cluster 116B in determining what features helped the cars sell faster.

In 340, the perspectives of the images in vehicle listings of the selected cluster are identified. For example, VLG 102 may compare the images 106A-C across the listings included in each cluster 116A, 116B, and 116C, and compare the similarities within each cluster across the various clusters 116A-C. VLG 102 may identify which perspectives (in the images 106A-C) of the cars 124 of each listing are most corresponding to a shorter sales time.

In 350, a sales template for the vehicle type including the identified perspectives of images corresponding at least a subset of the vehicle listings of the selected cluster is generated. The sales template may be a wizard program or preformatted template that indicate how to describe the common vehicle type for sale on a website. For example, VLG 102 may generate template 118 including a format 130 indicating what information (e.g., images, text, features, description, mileage, condition, color, etc.) may be necessary to generate listing 122 for website 126, where the car 124 may be listed for sale.

Figure 4:
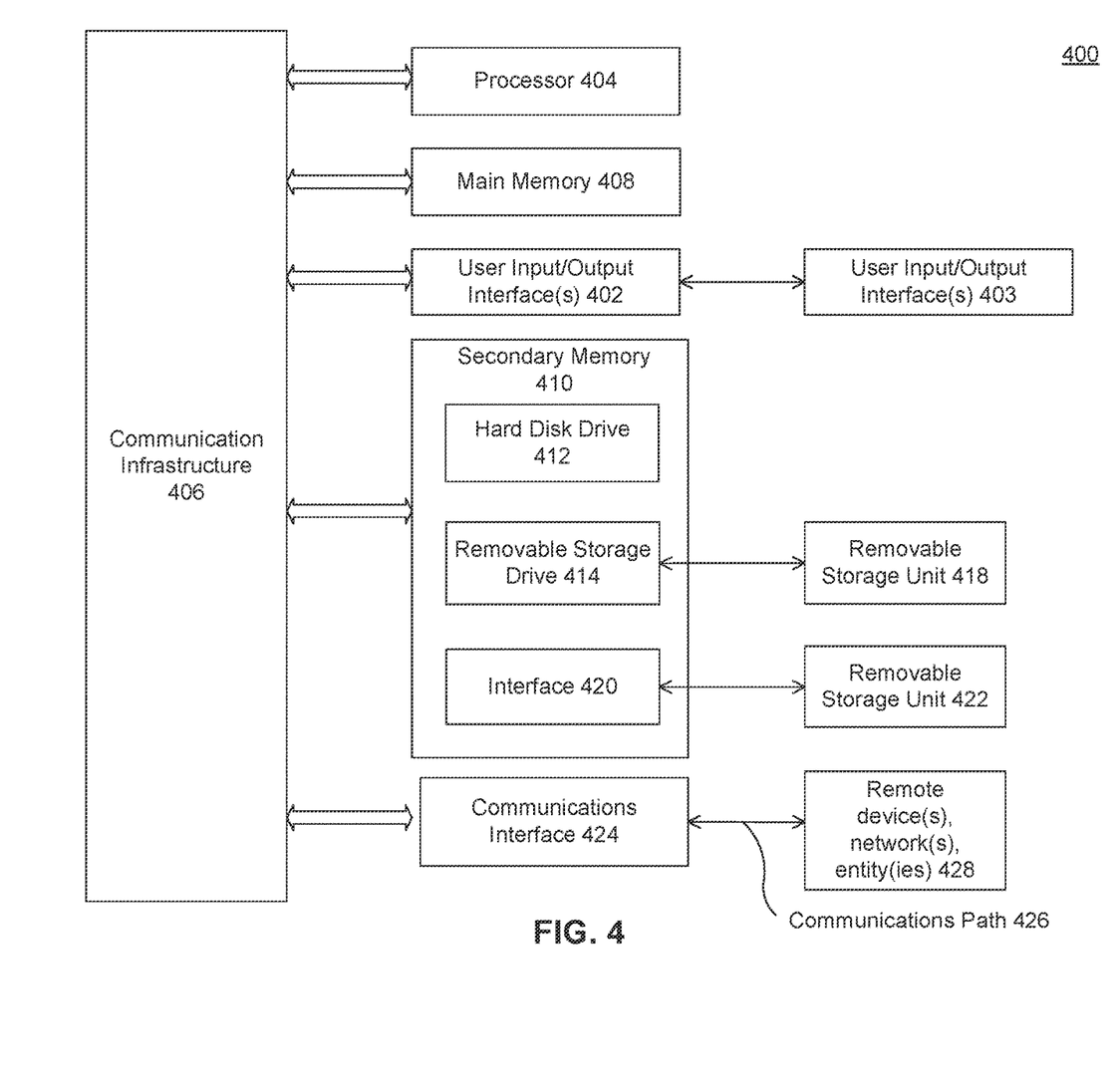
FIG. 4 is example computer system useful for implementing various embodiments.

Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof.

Computer system 400 may include one or more processors (also called central processing units, or CPUs), such as a processor 404. Processor 404 may be connected to a communication infrastructure or bus 406.

Computer system 400 may also include customer input/output device(s) 403, such as monitors, keyboards, pointing devices, etc., which may communicate with communication infrastructure 406 through customer input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
receiving a request to generate a vehicle listing to sell a vehicle on a website;
determining, by one or more processors, a plurality of vehicle listings similar to the vehicle associated with the request, wherein each vehicle listing, of the plurality of vehicle listings, includes a plurality of features providing information about a respective vehicle featured in the vehicle listing, and wherein each vehicle listing is associated with a sales time metric specifying a time it took to sell the respective vehicle featured in a respective vehicle listing;
performing artificial intelligence clustering on the plurality of vehicle listings based on the sales time metrics, wherein the artificial intelligence clustering produces a plurality of clusters, and wherein each cluster of the plurality of clusters includes one or more vehicle listings from the plurality of vehicle listings;
selecting, by the one or more processors, a first one of the plurality of clusters for which the sales time metric of the vehicle listings of the selected cluster is less than the sales time metric of the vehicle listings of a second one of the plurality of clusters;

identifying, by the one or more processors, which of the plurality of features are common amongst at least a subset of the vehicle listings of the selected cluster; and generating, by the one or more processors, a user interface of a sales template for the vehicle associated with the request, wherein the sales template includes the identified features that are common amongst at least the subset of the vehicle listings.

2. The computer-implemented method of claim 1, further comprising:

identifying, from the vehicle listings of the selected first cluster, an order of identified perspectives of images relative to one another;

wherein the generating comprises arranging the identified perspectives in the identified order.

3. The computer-implemented method of claim 1, wherein the performing comprises:

performing the artificial intelligence clustering on the plurality of vehicle listings based on the sales time metric and a sales price metric associated with each of the vehicle listings of the plurality of vehicle listings.

4. The computer-implemented method of claim 1, further comprising:

determining the plurality of features comprise one or more perspectives of images;

prompting a user for perspectives of images of the vehicle to be sold on the website corresponding to the determined perspectives of images from the plurality of features;

receiving images corresponding to at least a subset of the one more perspectives of images; and generating a sales listing for listing the vehicle associated with the request for sale on the website based on the sales template and including the received images.

5. The computer-implemented method of claim 4, further comprising:

calculating a score for the received images against the perspectives of the images corresponding to the sales time metric; and providing the score for display for the user.

6. The computer-implemented method of claim 5, further comprising:

determining that the score is below a threshold; and prompting the user for one or more missing identified perspectives of images of the particular vehicle, wherein the missing identified perspectives of images correspond to increasing the score.

7. The computer-implemented method of claim 1, wherein the plurality of vehicle listings have been sold through the website.

8. The computer-implemented method of claim 1, further comprising:

receiving, via the user interface, information corresponding to one or more of the identified features displayed in the sales template; and posting the vehicle listing to sell the vehicle on the website, using the information received via the user interface.

9. A system comprising:

a memory; and at least one processor coupled to the memory and configured to perform operations comprising:

receiving a request to generate a vehicle listing to sell a vehicle on a website;

determining, by one or more processors, a plurality of vehicle listings similar to the vehicle associated with the request, wherein each vehicle listing, of the plurality of vehicle listings, includes a plurality of features providing information about a respective vehicle featured in the vehicle listing, and wherein each vehicle listing is associated with a sales time metric specifying a time it took to sell the respective vehicle featured in a respective vehicle listing;

performing artificial intelligence clustering on the plurality of vehicle listings based on the sales time metrics, wherein the artificial intelligence clustering produces a plurality of clusters, and wherein each cluster of the plurality of clusters includes one or more vehicle listings from the plurality of vehicle listings;

selecting, by the one or more processors, a first one of the plurality of clusters for which the sales time metric of the vehicle listings of the selected cluster is less than the sales time metric of the vehicle listings of a second one of the plurality of clusters;

identifying, by the one or more processors, which of the plurality of features are common amongst at least a subset of the vehicle listings of the selected cluster; and generating, by the one or more processors, a user interface of a sales template for the vehicle associated with the request, wherein the sales template includes the identified features that are common amongst at least the subset of the vehicle listings.

10. The system of claim 9, the operations further comprising:

identifying, from the vehicle listings of the selected first cluster, an order of identified perspectives of images relative to one another;

wherein the generating comprises arranging the identified perspectives in the identified order.

11. The system of claim 9, wherein the performing comprises:

performing the artificial intelligence clustering on the plurality of vehicle listings based on the sales time metric and a sales price metric associated with each of the vehicle listings of the plurality of vehicle listings.

12. The system of claim 9, the operations further comprising:

determining the plurality of features comprise one or more perspectives of images;

prompting a user for perspectives of images of the vehicle to be sold on the website corresponding to the determined perspectives of images from the plurality of features;

receiving images corresponding to at least a subset of the one more perspectives of images; and generating a sales listing for listing the vehicle associated with the request for sale on the website based on the sales template and including the received images.

13. The system of claim 12, the operations further comprising:

calculating a score for the received images against the perspectives of the images corresponding to the sales time metric; and providing the score for display for the user.

14. The system of claim 13, the operations further comprising:

determining that the score is below a threshold; and prompting the user for one or more missing identified perspectives of images of the particular vehicle, wherein the missing identified perspectives of images correspond to increasing the score.

15. The system of claim 9, wherein the plurality of vehicle listings have been sold through the website.

16. The system of claim 9, the operations further comprising:
receiving, via the user interface, information corresponding to one or more of the identified features displayed in the sales template; and
posting the vehicle listing to sell the vehicle on the website, using the information received via the user interface.

17. A non-transitory computer-readable device having instructions stored thereon that, when executed by at least one computing device, cause the at least one computing device to perform operations comprising:
receiving a request to generate a vehicle listing to sell a vehicle on a website;
determining, by one or more processors, a plurality of vehicle listings similar to the vehicle associated with the request, wherein each vehicle listing, of the plurality of vehicle listings, includes a plurality of features providing information about a respective vehicle featured in the vehicle listing, and wherein each vehicle listing is associated with a sales time metric specifying a time it took to sell the respective vehicle featured in a respective vehicle listing;
performing artificial intelligence clustering on the plurality of vehicle listings based on the sales time metrics, wherein the artificial intelligence clustering produces a plurality of clusters, and wherein each cluster of the plurality of clusters includes one or more vehicle listings from the plurality of vehicle listings;
selecting, by the one or more processors, a first one of the clusters for which the sales time metric of the vehicle listings of the selected cluster is less than the sales time metric of the vehicle listings of a second one of the plurality of clusters;
identifying, by the one or more processors, which of the plurality of features are common amongst at least a subset of the vehicle listings of the selected cluster; and
generating, by the one or more processors, a user interface of a sales template for the vehicle associated with the request, wherein the sales template includes the identified features that are common amongst at least the subset of the vehicle listings.

18. The non-transitory computer-readable device of claim 17, the operations further comprising:
identifying, from the vehicle listings of the selected first cluster, an order of identified perspectives of images relative to one another;
wherein the generating comprises arranging the identified perspectives in the identified order.

19. The non-transitory computer-readable device of claim 17, wherein the performing comprises:
performing the artificial intelligence clustering on the plurality of vehicle listings based on the sales time metric and a sales price metric associated with each of the vehicle listings of the plurality of vehicle listings.

20. The non-transitory computer-readable device of claim 19, the operations further comprising:
determining the plurality of features comprise one or more perspectives of images;
prompting a user for perspectives of images of the vehicle to be sold on the website corresponding to the determined perspectives of images from the plurality of features;
receiving images corresponding to at least a subset of the one more perspectives of images; and
generating a sales listing for listing the vehicle associated with the request for sale on the website based on the sales template and including the received images.

* * * * *